United States Patent [19]

Asai

[11] 4,219,824

[45] Aug. 26, 1980

[54] THERMAL RECORDING APPARATUS

[75] Inventor: Nobuteru Asai, Hitachi, Japan

[73] Assignee: Hitachi, Ltd., Japan

[21] Appl. No.: 4,224

[22] Filed: Jan. 17, 1979

[30] Foreign Application Priority Data

Jan. 18, 1978 [JP] Japan .................................. 53-3400

[51] Int. Cl.² .......................................... G01D 15/10
[52] U.S. Cl. .............................. 346/76 PH; 219/216; 400/120
[58] Field of Search ................... 346/76 PH; 219/216; 400/120

[56] References Cited

U.S. PATENT DOCUMENTS 3,934,695  1/1976  Kovalick .................... 346/76 PH X
3,975,707  8/1976  Ito ................................. 346/76 PH
3,984,844  10/1976  Tanno ............................ 346/76 PH Primary Examiner—Joseph W. Hartary
Attorney, Agent, or Firm—Craig & Antonelli

[57] ABSTRACT

The output voltage of the drive power source for energizing the heating resistor elements on the thermal recording head, falls in response to the increase in the currents through the elements. This invention provides a thermal recording apparatus in which the time period for power supply to the elements is controlled in accordance with the number of the elements to be simultaneously energized so that the deficiency in the heat generated by each element, due to the voltage fall is obviated.

2 Claims, 6 Drawing Figures

THERMAL RECORDING APPARATUS

BACKGROUND OF THE INVENTION

1. Field of the Invention

This invention relates to a thermal recording apparatus and more particularly to a thermal recording apparatus in which a plurality of heating resistor elements are simultaneously energized to be heated so that information is recorded by coloring those portions of thermally responsive recording paper which are in contact with the heating resistor elements.

2. Description of the Prior Art

The conventional thermal recording apparatus usually has a plurality of heating resistor elements arranged in a line, the selected elements of which are energized for a predetermined period of time so as to color those portions of thermally responsive paper which are in contact with those selected elements. An example of such a thermal recording apparatus is disclosed in U.S Pat. No. 3,984,844 granted on Oct. 5, 1976 to K. Tanno et al. and assigned to the assignee of the present invention, entitled "THERMAL RECORDING APPARATUS". With this type of thermal recording apparatus, if the information to be recorded is all white, no heating resistor element is energized while all the heating resistor elements are energized if the information to be recorded is all black. Since each heating resistor element is energized for a preset period of time, the drive power source must have a constant voltage characteristic in order that every heating resistor element may be supplied with a constant amount of power even if the number of the used heating resistor elements is changed. If the voltage of the drive power source is appreciably lowered when all the heating resistor elements are energized, the power supplied to each element is decreased so that the element cannot generate heat enough to color the thermally responsive recording paper clearly. Thus, the resultant recorded information has a poor contrast and is difficult to recognize. Especially, if the recording speed must be set higher, a constant voltage drive power source is needed which can supply a very high voltage or a very large current. In that case, the size of the entire apparatus must be correspondingly increased and moreover the production cost also becomes higher. In general, the chance of recording the entirely or almost black information is very small. In the ordinary documents, the black is very small in comparison with the white. It is therefore uneconomical to prepare the drive power supply apparatus for the all black recording.

SUMMARY OF THE INVENTION

An object of this invention is to provide a thermal recording apparatus which can produce clear record with high contrast even though the used drive power source causes rather an appreciable voltage fall in response to the increase in the load current.

In this invention, the time for which the thermal head is energized is controlled in accordance with the driving mode (i.e. depending on the number of heating resistor elements to be energized).

According to this invention, the memory stores the time period for power supply long enough for the thermally responsive recording paper to be colored, the power supply time period being determined depending on changes in the voltage of the drive power source (i.e. the voltage applied to the heating resistor elements to be heated) in each driving mode. In actual recording, the number of heating resistor elements to be energized is counted and the time period for power supply is controlled in accordance with the content of the memory corresponding to the counted number so that the amount of heat generated by each heating resistor element is kept constant for every drive mode.

DESCRIPTION OF THE PREFERRED EMBODIMENT

Figure 1:
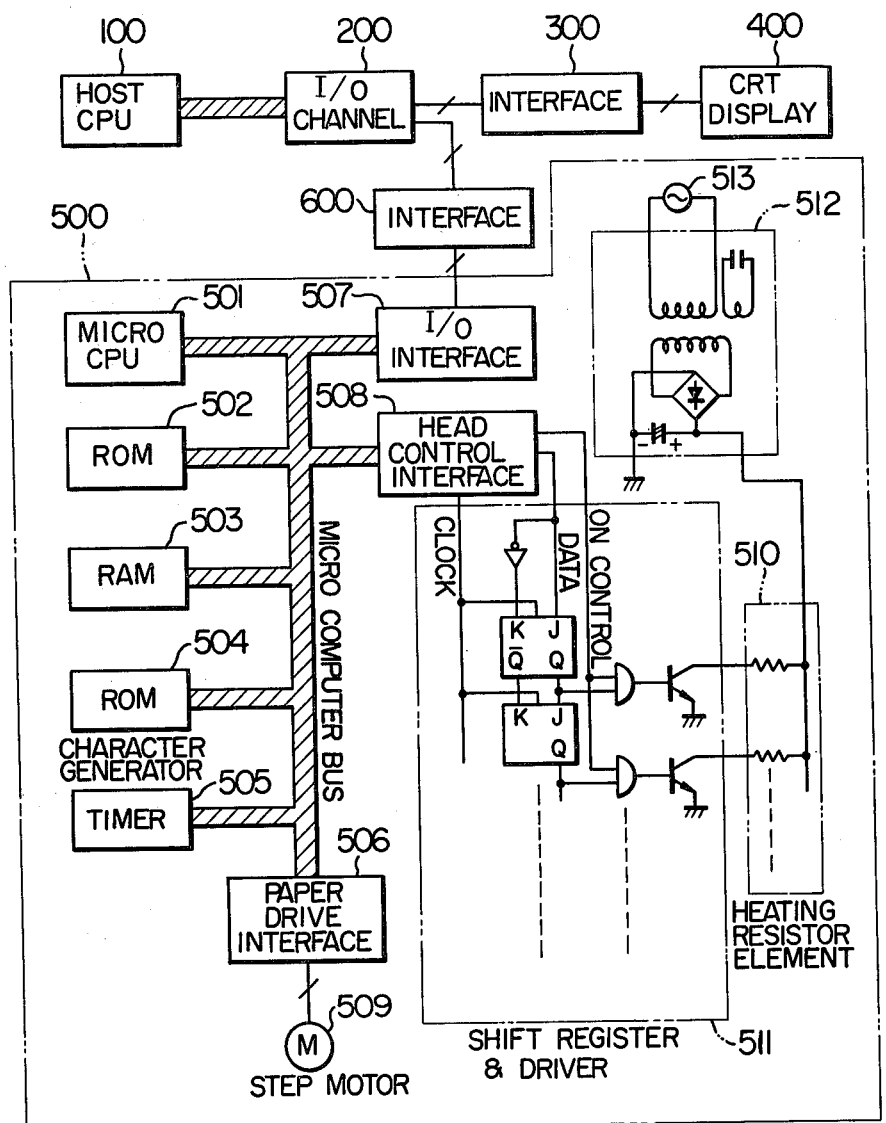
FIG. 1 shows the electrical wiring diagram of a thermal recording apparatus as an embodiment of this invention.

In FIG. 1, a host central processing unit (hCPU) 100 is connected, through an input/output channel 200 and an interface 300, with a CRT display device 400, which produces desired information in the form of images on its picture screen. A control circuit 500 for a thermal recording apparatus includes therein a micro central processing unit ($\mu$CPU) 501; a read only memory (ROM) 502 for storing execution programs for the $\mu$CPU 501; a random access memory (RAM) 503 for storing a row of characters to be recorded and for temporarily storing desired information during the execution of a program; a read only memory (ROM) 504 for receiving character codes and for delivering dot matrix patterns representing characters; a timer 505; a paper drive control interface 506; an external interface 507; and a control interface 508 for controlling the heating resistor elements on a recording head, all the above parts being interconnected with each other by means of microcomputer bus. The external interface 507 is connected with the input/output channel 200 through an interface 600. The paper drive control interface 506 is connected with a step motor 509. The heating resistor elements on a thermal recording head 510 are connected, through a shift register and driver 511, with the heating resistor element control interface 508. A drive power source 512, which is of ferro-resonance type, is connected with an external supply 513. The paper drive control interface 506, the external interface 507 and the heating resistor element control interface 508 are each constituted of LSI devices and PIA's (peripheral interface adapters).

Figure 2:
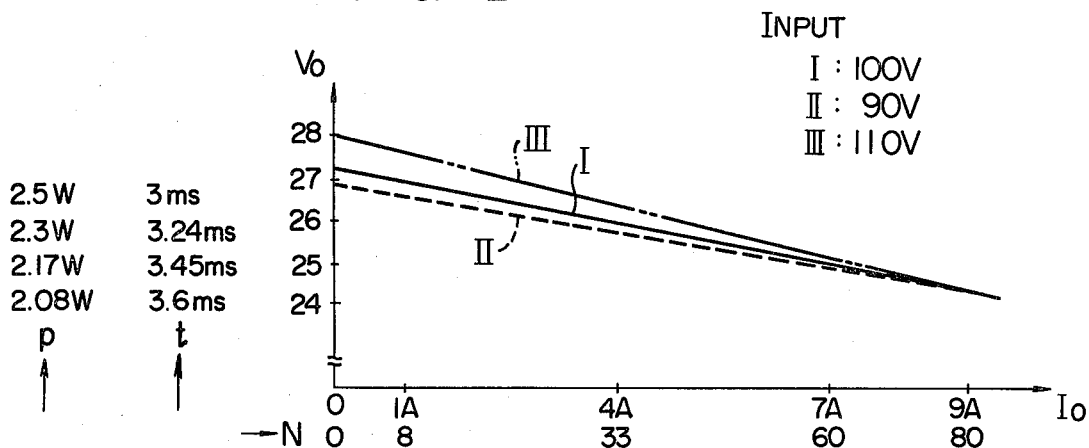
FIG. 2 shows load characteristics of the power source used in this invention.

FIG. 2 shows the electric characteristics of the drive power source 512, representing the relationships between the load current $I_o$ and the output voltage $V_o$. These characteristics are those of a quasi-stabilized power source of ferro-resonance type, with a rated voltage and current of 24 V and 9 A. The resistance value of each of the heating resistor elements on the thermal recording head 510 driven by the power source 512 is 160$\Omega$. Therefore, when a voltage of 20 V is applied to the element, it consumes power of 2.5 W, a current of 0.12 A flowing through it. Along the ordinate in FIG. 2 are indicated for the voltages of the power source, actual powers P consumed by the heating resistor elements and time periods t required for supplying power (equal to heat amount of 7.5 mJ)

enough to clearly color the thermally responsive recording paper. Since circuit loss exists between the drive power source 512 and the recording head 510, the power source voltage $V_o$, the resistance value of the heating resistor element and the associated power do not satisfy the theoretical equation. Also, along the abscissa are indicated for the load currents $I_o$, the numbers N of heating resistor elements to be energized. The relationships between the numbers N and the correspondingly required power supply time periods t, are stored in the ROM 502.

The $\mu$CPU 501 takes in character codes for a full recording line, causes the ROM 503 to store the character codes taken in and delivers a busy signal to enter into the recording state. The character codes are first converted to dot matrix patterns in accordance with the contents of the ROM 504 and then the converted dot matrix patterns are stored in the RAM 503. At the time of recording, the dot data for the first matrix line is read out from the RAM 503 and then supplied to the flip-flop (register) of the shift register and driver 511 through the interface 508. Simultaneously, the number of dots subjected to heating is counted and the timer 505 is set by receiving the data representing the required power supply time period. The measuring of time is started simultaneously with the turn-on of the driver and when the required power supply duration has lapsed, the driver is turned off. After the first matrix line has been recorded in this way, the step motor 509 is driven to shift the recording paper by a single matrix line forward. At the next time of recording the second matrix line, the dot data for the second matrix line is read out from the RAM 503 and the shift register and driver 511 is actuated in like manner in accordance with the number of dots to be heated so that the corresponding heating resistor elements are energized. When the recording of the matrix lines for a full recording line is completed, the $\mu$CPU 500 stops delivering the busy signal and starts receiving the character information for the next recording line.

The thermal recording head used in the embodiment of this invention is capable of recording 16 characters on a full recording line. Each character is represented by some of $5 \times 7$ matrix dots (7 dots for a single matrix line) and therefore 80 heating resistor elements ($5 \times 16$) are arranged in a straight line to form a single recording line, no element being provided in every intercharacter space.

Figure 3:
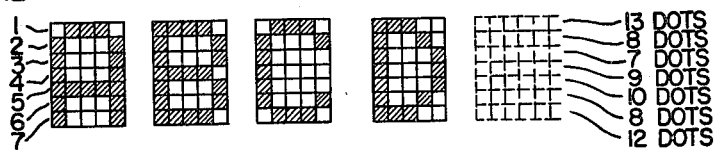
FIG. 3 shows several phases of the recording dot matrix.

In the case where four characters "ABCD" having no space between them and starting at the beginning of a recording line, are recorded, the character codes corresponding to the 16 characters such as "A", "B", "C", "D", "S/P" (space), . . . , "S/P" are received by and stored in the RAM 503. The stored character information is then converted to the corresponding dot matrix patterns in accordance with the contents of the ROM 504 so that the patterns as shown in FIG. 3 can be obtained. In the first matrix line, the number of the heating resistor elements to be simultaneously energized is 13. Similarly, 8, 7, 9, 10, 8 and 12 elements are energized respectively for the second, third, fourth, fifth, sixth and seventh matrix lines. With the power source 512 having the characteristics as shown in FIG. 2, 13 elements are simultaneously energized for 3.15 mS for the first matrix line.

Figure 4A:
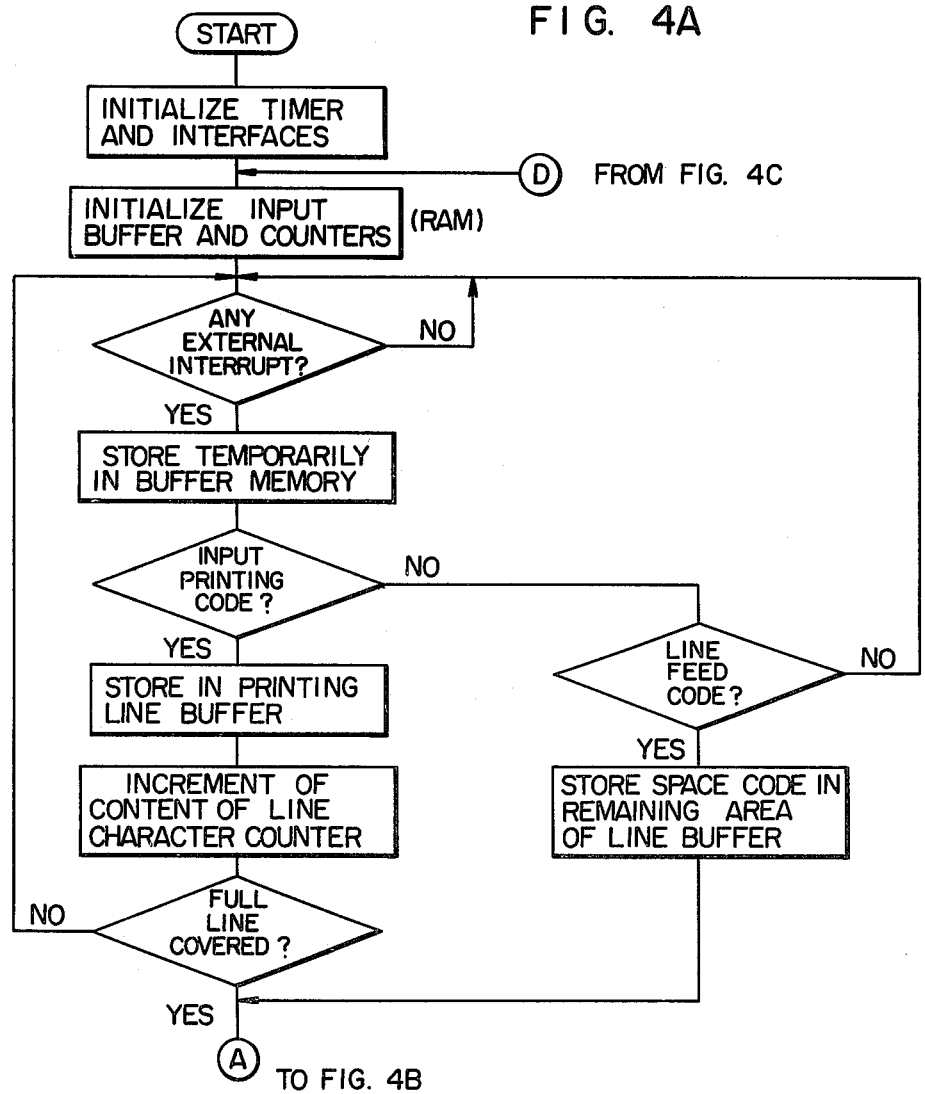
FIGS. 4a to 4c are flow charts useful in explaining the operation of the apparatus shown in FIG. 1.
Figure 4B:
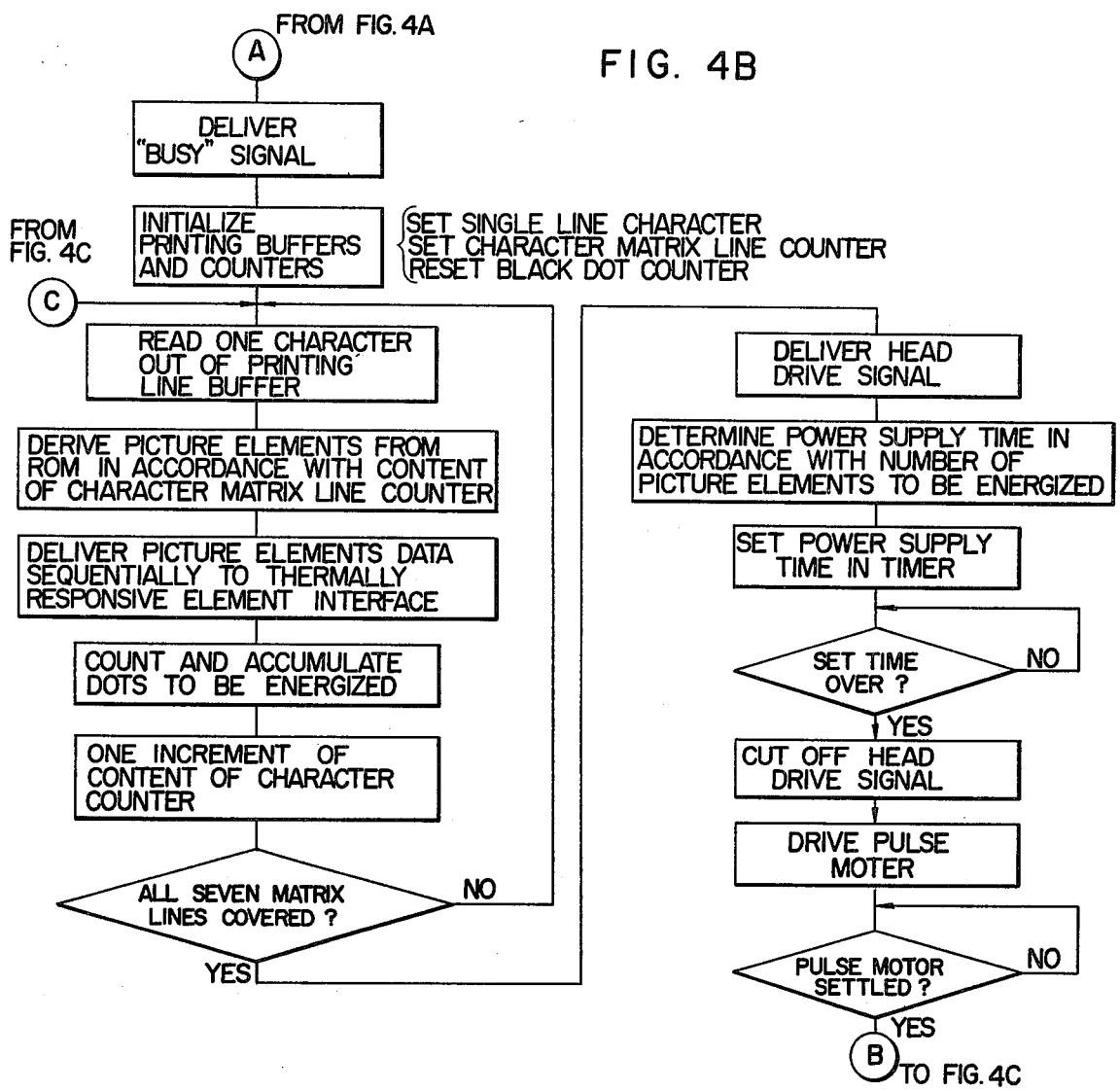
Figure 4C:
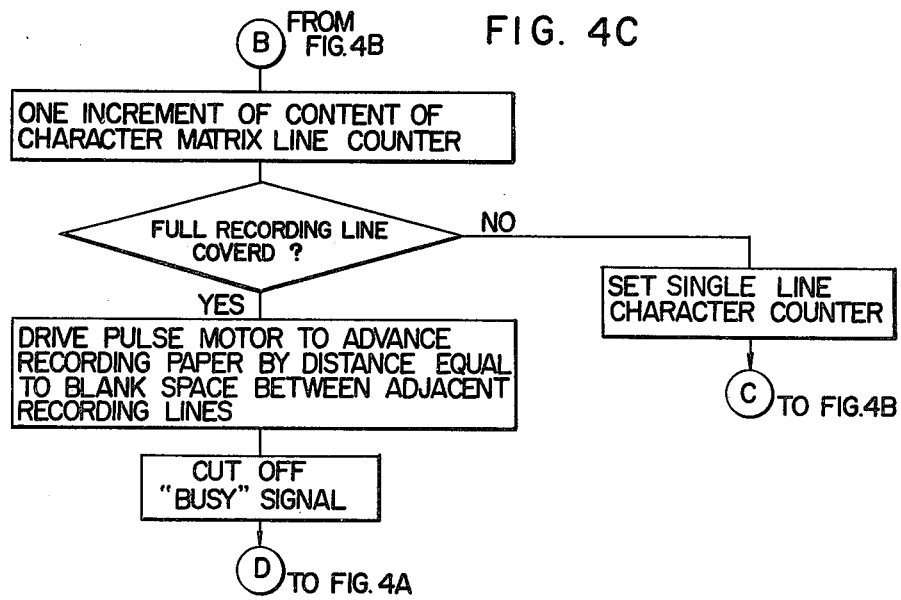

FIGS. 4A, 4B and 4C are flow charts. In the flow chart shown in FIG. 4A, START is followed by the initializations of the timer 505 and the interfaces, and the initializations of the input buffer memory and the counter of the RAM 503. When the host CPU 100 delivers an output, the output is stored in the temporary buffer memory of the RAM 503 so as to be judged whether it is a printing code or not. If the output is a printing code, it is stored in the printing line buffer memory of the RAM 503 and an increment of the line character counter is effected to cause the information for a single matrix line (16 characters) to be recorded. When a line feed code (L/F) is delivered meantime, space codes (S/P) are thereafter stored in the printing line buffer memory. After the codes for 16 characters on a single matrix line have been stored, the $\mu$CPU 501 delivers a "BUSY" signal, as shown in FIG. 4B, to enter into the printing or recording process. Then, in the flow chart in FIG. 4B, the single line character number counter, the character matrix line counter and the black dot (energized heating resistor element) number counter are initialized. Thereafter, a character is read out from the printing line buffer memory and the picture element data for the corresponding matrix line is derived from the ROM 504 in accordance with the content of the character matrix line counter. The picture element data are supplied to the interface 508 and at the same time the number of heating resistor elements to be energized is counted. The above series of operations are repeated for 16 characters and when the process for a single matrix line has been completed, a recording head drive signal is generated. In the case of recording four characters as shown in FIG. 3, the number of the heating resistor elements to be energized for the recording of the first matrix line is 13 and the timer 505 is set to measure 3.15 mS. After the heating resistor elements have been energized for the period of 3.15 mS, an OFF signal is delivered to cut the currents through the elements and the step motor 509 is rotated to advance the recording paper by a single matrix line. Next, a shown in the flow chart in FIG. 4C, one increment of the character matrix line counter is effected to count up to judge whether a full recording line consisting of seven matrix lines has been covered or not. Unless the full recording line is covered, the single line character counter is set to execute the processing of printing for the next matrix line, as shown in FIG. 4B. When the printing of the full recording line, i.e. all the seven matrix lines, has been completed, the step motor 509 is driven to advance the recording paper by a distance equal to the blank space between the adjacent recording lines. And the "BUSY" signal is cut off in preparation for the reception of the next printing input signal.

In the above-described embodiment the printing process is executed one matrix line after another. However, if the heating resistor elements are so arranged as to simultaneously form an X-Y matrix, it is possible to control the power supply time period for a character or some characters in blocks in a similar manner.

If the power supply time period is corrected, when the voltage of the external power source 513 fluctuates, to compensate for the fluctuation, then a further improved result will be obtained.

As described above, according to this invention, even if a power source apparatus whose output voltage falls to a considerable extent depending on the load current, is used, the recording or printing of characters with uniform contrast and depth can be realized by keeping the amount of heat generated by each heating resistor element at a preset value through the control of the power supply time period to every element.

I claim:

1. A thermal recording apparatus having a plurality of heating resistor elements and a control circuit for controlling the power supplied to said elements, wherein those of said elements which correspond to the black dots of the information to be recorded are selectively heated by supplying currents to them, said control circuit comprising:
- a quasi-stabilized power source connected with said heating resistor elements;
- a power supply time period setting means for previously setting the power supply time period corresponding to the number of the simultaneously energized heating resistor elements in accordance with the load characteristics of said power source;
- a counting means for counting the number of the heating resistor elements energized simultaneously in accordance with the recording information; and
- a power supply time control means for controlling the time period for power supply to said heating resistor elements in response to the output of said counting means in accordance with said time period set by said power supply time setting means.

2. A thermal recording apparatus as claimed in claim 1, wherein said control circuit further comprises a first means for converting the input character codes to the corresponding dot matrix characters and a second means for reading the dot information signal corresponding to the matrix line to be printed.

* * * * *